(12) United States Patent
Spotti

(10) Patent No.: US 9,634,487 B2
(45) Date of Patent: Apr. 25, 2017

(54) ARCHITECTURE AND MANAGEMENT SYSTEM AND DEVICE FOR MICRO-GRIDS WITH ENERGY GENERATION, STORAGE AND CONSUMPTION, OF THE TOTALLY INTEGRATED, DYNAMIC AND SELF-CONFIGURABLE TYPE

(71) Applicant: REGAL GRID SRL, Rome (IT)

(72) Inventor: Davide Spotti, Trieste (IT)

(73) Assignee: REGAL GRID SRL, Rome (IT)

( * ) Notice: Subject to any disclaimer, the term of this patent is extended or adjusted under 35 U.S.C. 154(b) by 189 days.

(21) Appl. No.: 14/441,382

(22) PCT Filed: Nov. 6, 2013

(86) PCT No.: PCT/IB2013/002467
§ 371 (c)(1),
(2) Date: May 7, 2015

(87) PCT Pub. No.: WO2014/072793
PCT Pub. Date: May 15, 2014

(65) Prior Publication Data
US 2015/0303692 A1  Oct. 22, 2015

(30) Foreign Application Priority Data
Nov. 7, 2012 (IT) .............................. TV2012A0208

(51) Int. Cl.
*H02J 3/12* (2006.01)
*H02J 3/14* (2006.01)
*H02J 3/32* (2006.01)
*H02J 3/38* (2006.01)

(52) U.S. Cl.
CPC ........ *H02J 3/12* (2013.01); *H02J 3/14* (2013.01); *H02J 3/32* (2013.01); *H02J 3/382* (2013.01); *Y02B 70/3225* (2013.01); *Y02E 70/30* (2013.01); *Y04S 20/222* (2013.01)

(58) Field of Classification Search
CPC  Y04S 20/222; Y02E 70/30; H02J 3/32; H02J 3/14
USPC .......................................................... 307/2
See application file for complete search history.

(56) References Cited

U.S. PATENT DOCUMENTS

2009/0088907 A1  4/2009 Lewis et al.
2010/0191996 A1  7/2010 Iino et al.

FOREIGN PATENT DOCUMENTS

JP    2008061417 A    3/2008

*Primary Examiner* — Robert Deberadinis
(74) *Attorney, Agent, or Firm* — Egbert Law Offices, PLLC

(57) ABSTRACT

Architecture system of a local grid made up of at least two single nodes constituting micro-grids, each managed by a self-configurable node controller that is also connected to the controllers of the other nodes and to the single energy generation, storage and consumption elements of its own node, the elements being variable in their configuration and dynamic in their behavior; the controller also optimizing the energy transfers according to specific management logics of the routine and sub-routine type.

10 Claims, 14 Drawing Sheets

ARCHITECTURE AND MANAGEMENT SYSTEM AND DEVICE FOR MICRO-GRIDS WITH ENERGY GENERATION, STORAGE AND CONSUMPTION, OF THE TOTALLY INTEGRATED, DYNAMIC AND SELF-CONFIGURABLE TYPE

The present invention relates to an architecture and management system and device for micro-grids able to connect elements that at the same time are of energy generation, storage and consumption, also being conventionally called with the combined acronym pro-con-sto-mer deriving from the English terms producer, consumer and storer; said micro-grids being, in particular, of the totally integrated, dynamic and self-configurable type.

The invention finds particular although not exclusive application in the field of energy production, distribution, storage and measurement, specifically of electrical nature but not exclusively, particularly in the evolved systems of energy and information transfer that are conventionally called smart grids in the English language.

Recently, new solutions of electricity grids of the smart type are being studied and experimented, which are able to integrate the actions of the various users connected, they being consumers and also producers, mainly from renewable sources, also called prosumers in English, for the purpose of distributing energy in a more efficient, economical, safe and sustainable way in the long term. Such evolved grids, conventionally called smart grids in English, besides supplying and receiving energy, enable the exchange of information and, in particular, an improved management and control of the users and of the energy transfers where required.

It is also known that said smart grids have the aim of transforming the current electric power centralized production system, with the related long-distance distribution, into a plurality of said prosumers also interconnected in a smart way, said grids being of the active type and further equipped with electronic components and computer systems that realize suitable communication and suitable control, in such a way as to enable an improved management of the energy flows produced by the traditional stations and also an improved management of the medium and small productions from renewable sources, such as photovoltaic, aeolic and thermal solar, also overcoming the known and complex difficulties related to the backflow.

In more detail, a bidirectional and improved integration system as described above will have to ensure that each single energy consumer and producer is connected to the grid in such a way as to communicate and receive data for the purpose of making available in real time the consumption and production profiles and be useful to the manager of the grid in the planning of the energy production and distribution. With such aims, even long-term, for example purposes we would like to remind that the first solutions of smart meters have been recently introduced on the market, otherwise called smart meters in the English language, having been designed to integrate said grids of the smart grid type; in particular, said smart meters are connected to a communication grid for the purpose of allowing a control of the bidirectional type. It is completely evident, however, that in the total re-definition of the traditional electrical grids, from passive and centralized to diffused and bidirectional systems of the smart grid type, it will not be sufficient to introduce new smart meters but new total integration and control solutions are needed that are able, for example, to optimize the efficiency of the single elements connected, to reduce the energy transfer distances, to reduce the drawings and the wastes from the public grid, to suitably compensate for the reactive loads generated by the single grid nodes, and favour the exchanges between users, it therefore being necessary also to introduce new electronic control devices equipped with algorithms able to manage and optimize in such sense the flows in the most convenient and safest way.

PRIOR ART

For the purpose of determining the prior art relative to the proposed solution a conventional verification has been made, searching public databases, which has led to find some prior art documents, such as the documents US2012/0159211 (Kim et al.), US 2012/0158195 (Kim et al.), WO2012/097204 (Carr), US2009/0088907 (Lewis et al.), US2009/0003243 (Vaswani et al.), WO2011/017525 (Alexander), US2012/0215370 (Seo et al.), US2009/0135753 (Veillette). Such solutions describe various solutions of grids, also of the type with nodes and structured, mainly with reference to communication modes between the single nodes and to the relative protection, or to the metering systems or also to the logics of sampling and estimate of consumption, or still to the hierarchical control systems.

Drawbacks

The known and conventional solutions have some drawbacks and in particular in view of a complete integration in grids of the smart type. Such solutions, for example, do not describe how to realize an evolved and optimized system of a local energy grid with nodes each being simultaneously energy generator, storer and consumer of the totally integrated, dynamic and self-configurable type; said known and conventional solutions, moreover, do not provide specific management logics for such optimizations according to the different state conditions of each single node.

SUMMARY OF THE INVENTION

These and other aims are achieved by the present invention according to the characteristics as in the appended claims, solving the mentioned problems by an architecture system of a local grid (10) made up of at least two nodes (11) constituting single micro-grids, each managed by a self-configurable node controller (200) that is also connected to the controllers of the other nodes and to the single energy generation, storage and consumption elements of their own node, such elements being variable in their configuration and dynamic in their behaviour; said controller (200) also optimizes the energy transfers according to specific management logics of the routine and sub-routine type.

Aims

By the considerable creative contribution the effect of which constitutes an immediate technical progress various aims are achieved.

In the first place, it is possible to obtain the optimization of each single node with total integration both inside, towards the elements that constitute it, and outside, towards the other nodes and grids, and also allowing to automatically compensate for the changes in energy production, requirements and storage, being of the dynamic and self-configurable type. In particular, said node allows a bidirectional dialogue of the one-to-one type between the single elements that make it up, being equipped with own intelligence, and also between the single interconnected nodes forming said micro-grid, according to a specific management logic provided by an electronic device that acts as controller of the single node; said node, moreover, allows a variable configuration of realization being able to recognize the modifications in the number and type of connected components and automatically adapt to them according to specific needs, such as maintenance, deactivations for safety reasons, the free addition of new elements or the elimination or replacement of existing elements.

A second aim allows to combine the historic use profiles of the single elements of generation, storage and of the loads of the single nodes, in particular with a self-learning logic, for the purpose of giving information and operating addresses on the variation of the configuration and/or use of said components of the node.

A third aim allows to obtain the optimization of the whole local grid made up of said nodes, each single node being connected in such a way as to allow a bidirectional dialogue between the controllers of all the nodes, according to a specific control logic that allows said controller to equally contribute to the management of said local grid.

A further aim is referable to the fact that it enables a profitable and optimized management for the whole day and on any day of the year, integrating the generation, the storage and the use of electric and/or thermal power, mainly but not exclusively from renewable sources such as solar energy, in particular both by one single consumption and generation node, and by said local grid of opportunely interconnected and managed nodes, also with specific logics.

A further aim consists in limiting the resort to the external energy distribution grid.

Another aim is to relieve said external grid from the time peaks of energy input or transfer.

A further aim is to make non-synchronized the production and the consumption of the single node by means of its own storage, and also allowing said node to enjoy the storage capacity of the others nodes of the same local grid, therefore a smaller storage quantity being necessary for each single node. So one advantageously replaces the known figure of the prosumer, that is to say, the user that is only an energy producer and consumer, with that of the so-called proconstomer, that is to say, the user that simultaneously is an energy producer, consumer and storer, whose connection to other proconstomers brings greater synergic advantages than those of the conventional smart grids as described so far.

As a consequence, a further aim is to allow a better planning in the despatching and distribution of the electric power by the department utilities or national grids of medium voltage, or MV, and of high voltage, or HV.

An additional aim is the consequent greater operation regularity and linearity of the big national energy production plants that, having more regular downstream loads and equipped with storage and local management with internode compensations between production, storage and consumption, will see a reduction in demand peaks, thus using the characteristic of the so described local grids also called peak shaving in English, and hence obtain a greater operational economy.

A further aim consists of the fact of having to transport a smaller amount of energy for medium or long sections, with consequent lower losses and greater global efficiency.

A further aim is to make the node and the whole local grid scalable and modular, that is to say, able to increase or decrease the generation and storage capacity, at any time and without particular restrictions besides the sizes of the electric cables. In particular, for maintenance or safety problems, the invention allows to cancel or reduce the generation or storage capacity of the single elements, being connected in a bidirectional way to said node controller device; moreover, the system allows to automatically or voluntarily lower voltage to safety values at any time. Such a system also allows to monitor and optimize the use of the single generation and storage elements, avoiding overloads and malfunctions and also ensuring greater efficiency. This system also enables a complete integration of the functions of diagnostics, control and tele-measurement both at the level of the node and at the level of the local grid, to suitably compensate for, foresee and plan the energy requirements of the node, of the grid and of the districts. Such a system of a local grid with nodes is also connectable to other equally structured local grids for the purpose of realizing a grid of local grids, therefore being enlargeable on a large scale with the same benefits as the small scale, as described above.

The wide availability of data and information provided and available at the level of each single node and local grid will allow a virtuous and advantageous change in the consumption profiles. The proconstomers will become more and more informed, responsible and able to manage an advantageous consumption profile according to the energy produced, stored and from time to time transferable to other nodes. Facilitating and supporting such evaluative and decisional process is a further aim of the invention.

These and other advantages will appear from the following detailed description of some preferred embodiments, also with the aid of the enclosed schematic drawings that are not to be considered limitative but only illustrative.

CONTENT OF THE DRAWINGS

FIGS. 1a, 1b, 1c show three simplified diagrams of the distributed local grid provided by the invention, made up of a plurality of energy micro-grids called nodes (N) individually comprehensive of micro-storage (A) and micro-generation (G) of energy, mainly from renewable sources, where said nodes conveniently generate, store and exchange energy, then consuming it (C), being possibly connected also to the energy grid external to said utility grid, wherein the connections of the node n differ according to the three possible state conditions:

simultaneously connected to the local grid and to said utility grid (FIG. 1a);
connected to the local grid only (FIG. 1b);
temporarily connected to the utility grid only (FIG. 1c).

PRACTICAL REALIZATION OF THE INVENTION

Figure 1A:
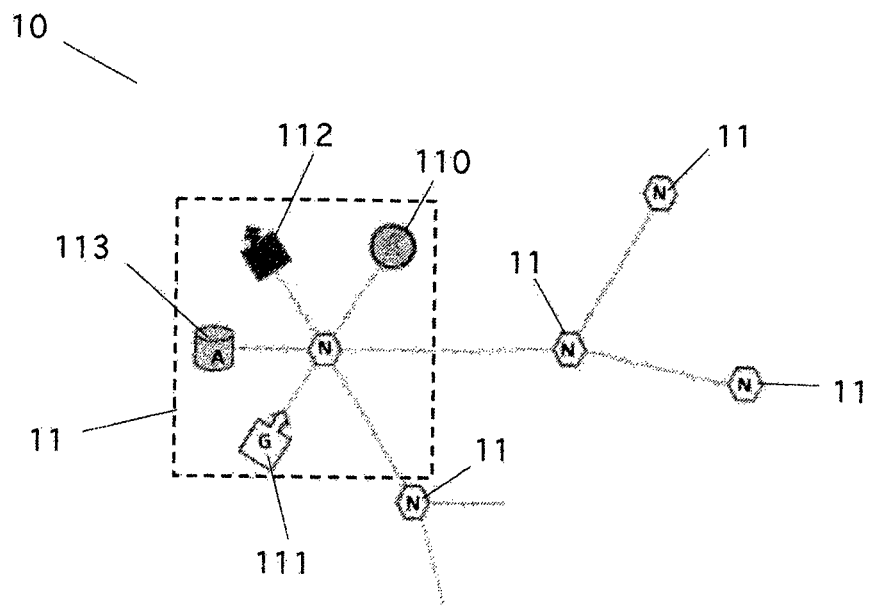

The following terms in the following of the description assume the meanings as specified:

Node: micro-grid able to simultaneously connect energy generation, storage and consumption elements. A node may also be connected to one or more other nodes in a local grid; furthermore, a node may also be connected to a utility grid.

Proconstomer is a contraction of the English terms producer-consumer-storer: it refers to an entity that simultaneously or not allows the generation, the consumption and the storage of energy.

Prosumer is a contraction of the English terms producer-consumer: it refers to an entity that simultaneously or not allows the generation, the consumption and the storage of energy.

Smart grid: a grid of entities that exchange information and/or energy between each other performing retroactive behaviours that allow advantages of various types such as of economic nature, of environmental nature, of efficiency, of distributed information, of control, of management, of duration or other.

Local grid: a grid of nodes connected to each other, in which there is simultaneously at least one element or device of energy generation and/or storage and/or consumption. The local grid is a smart grid that adopts a connection logic as described in the invention, being based on the connection of the proconstomer nodes defined above.

Utility grid: a traditional grid of electrical distribution, or also of another form of energy such as thermal energy; generally said grid is of the national or departmental or municipal type.

Variable: in the invention one normally defines as variable the physical configuration of connection of the equipment connected to said node, which may change according to the number and type of generation, storage or consumption devices from time to time connected or excluded from the connection to the node and to its node controller, as described in the following. Variable is also the connection from node to node in said local grid.

Dynamic: in the invention one normally defines as dynamic the behaviour in time, past and/or future, of characteristic specific parameters of the node given the same configuration. Over time, in particular, for each node the profiles of energy generation, storage and consumption change dynamically.

Self-configurable: in the invention one normally defines as self-configurable the characteristic of each node of verifying and recognizing how many and which types of generation, storage or consumption devices from time to time are connected to the node itself and to its node controller, as well as how many and which nodes are connected to the same node in the local grid.

State condition, being the type of possible state of connection of each single node, one distinguishes three possible cases: a) simultaneously connected to the local grid and to said utility grid; b) connected to the local grid only; c) temporarily connected to the utility grid only.

Communication or dialogue: in the invention one normally defines as communication or dialogue between nodes or between node and single device connected to the node, being of the type of generation or storage or still of consumption, the exchange in one or both directions of information and/or of energy.

Optimization: making of choices aimed at obtaining a desired or more advantageous condition expressed by means of logics or algorithms according to a series/combination of existing conditions and/or of measured and/or pre-assigned parameters.

Smart: in the invention smart is the device or the node characterised by communication and/or optimization abilities, as described above.

Routine and sub-routine: calculation and/or evaluation logic that from a set of parameters or states provided in input determines others and/or further in output.

Node controller: in the invention one normally defines as such an electronic system equipped with memory, programmable logic and suitable software for the monitoring, the dialogue and the management of the elements of generation, storage and consumption of the energy managed in the node as well as of management and dialogue with the other nodes connected in the local grid; this node controller applies the logics provided by the present invention.

The invention relates to the realization of a local grid (10) made up of the connection of nodes (11) with advantageous and optimized management in the 24 hours of any day of the year between generation, storage and use, contemporary or deferred, of electric and/or thermal power from renewable sources, mainly but not exclusively of solar origin, both by the single energy micro-grid that is conventionally called user and generation node or simply node (11), and by the grid of opportunely interconnected and managed nodes, which is also called local grid (10).

The described solution allows, in particular, to optimize the management of the single node (11) and also to optimize the management between the nodes. For this purpose, said local grid (10) substantially manages a distributed grid of micro-generation and micro-storage of energy from renewable sources, although not exclusively from said sources, between nodes (11) that conveniently generate, store and exchange energy, then consuming it.

Figure 1B:
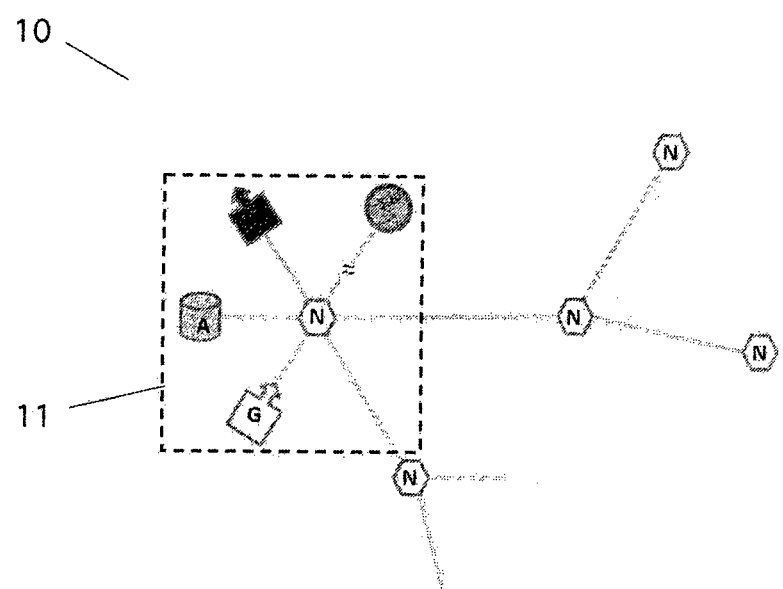

In more detail, the elements of the node that generate (111), store (113) and consume (112) energy are variable in their configuration and dynamic in their behaviour, just like said local grid (10) can be variable and dynamic, said variability in the configuration and said dynamism in the behaviour being applicable both to the node (11) and to the grid (10). Each single node (11) and also the local grid (10), therefore, are able to control simultaneously and dynamically, according to the instantaneous configuration, the consumption, the generation and the storage of energy. The logical diagram of reference, of the purely illustrative type, is shown in (FIGS. 1a-1c), wherein each node (11) can: consume energy by means of said consumption elements (112), the consumption being conventionally indicated with the letter C; generate energy by means of said generation elements (111), said generation being conventionally indicated with the letter G; store energy by means of said storage elements (113), the storage being indicated with the letter A; draw energy from an external utility grid (110) such as the national grid that is conventionally represented by the symbol of the pylon; give or draw energy to/from at least one of the nodes (11) of the local grid (10) to which it is connected.

Figure 1C:
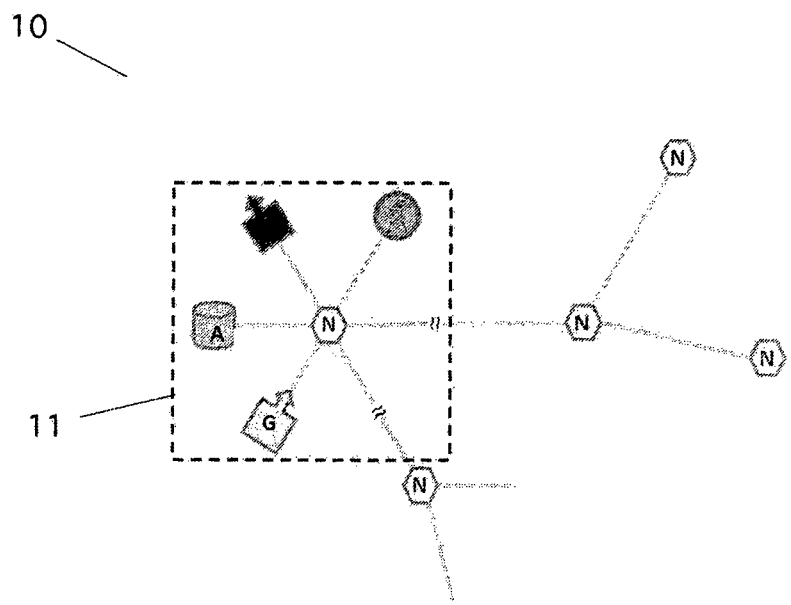

In particular, the connections of the single node provide at least one of the three following state conditions:
  first state condition (condition a): the single node is simultaneously connected to said local grid and also to the utility grid (FIG. 1a);
  second state condition (condition b): the single node is connected to the local grid only, permanently or temporarily (FIG. 1b);
  third state condition (condition c): the single node is temporarily connected to the utility grid only (FIG. 1c).

The resort to the external energy grid (110), also conventionally called utility grid, and that generally refers to the national, departmental or municipal supplier of electrical services, is made by one of the nodes (11) only in one of the following cases: saturation of the storage capacity of the whole local grid (10) against further energy generated by a node that can therefore be transferred to the external grid, shortage of energy stored in each node against a consumption requirement greater than the level of energy generated in that moment.

Figure 2:
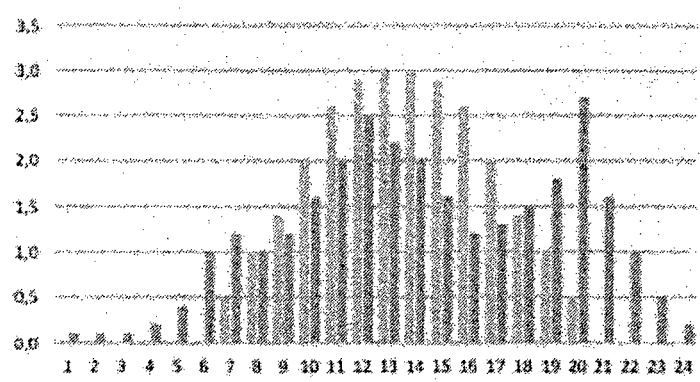
FIG. 2 is a chart relative to the generated electric power (EGT1) and to the consumed power (ECT1), measured in KWh in the 24 hours, in a hypothetical Node1.
Figure 3:
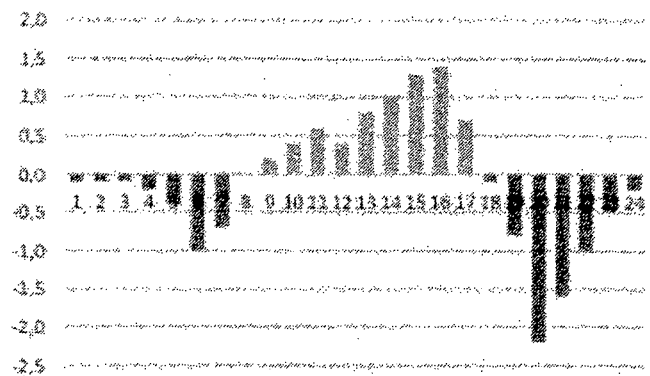
FIG. 3 is a chart relative to the difference between the generated power (EGT1) and the consumed power (ECT1) in Node1, as in FIG. 2.
Figure 4:
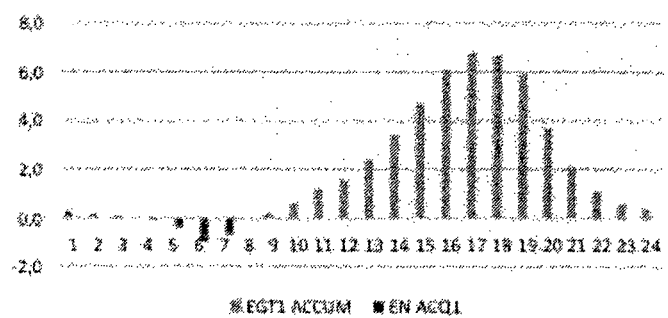
FIG. 4 is a chart relative to the stored electric power (EGT1 ACCUM) with respect to the purchased power (EN ACQ1) in Node1, as in FIG. 2, also being equipped with the storage system.

Specifically, the invention is born out of the need to combine in the most advantageous way possible the profiles of local generation EGT (Energy Generated in Time) with the profiles of local consumption ECT (Energy Consumed in Time) of a single node N (11), which normally are never synchronous. For example, see FIG. 2 concerning the generation and consumption of electric power in a hypothetical Node1 at the various hours of an X day; and still, for example, see FIG. 3 with negative values as would be the resort to the external grid for the purchase of energy necessary to the Node1 on the same X day. The solution of the storage of energy at the node allows to uncouple over the day the EGT and ECT profiles and to limit the resort to the grid for the purchase of the necessary energy. In FIG. 4, for example, one can see over the same X day the situation for the node 1 provided with an appropriate energy storage system: the produced energy EGT1 and opportunely stored in the node mostly covers the requirements ECT1 of the node itself, decreasing the resort to the external grid (negative values). Moreover, by opportunely exploiting the possibility of equipping the generation and storage elements with appropriate intelligence so as to activate a dialogue inside the single node, the innovative and original solution described in the following is obtained. Furthermore, by opportunely exploiting the possibility of equipping each node (11) with appropriate intelligence so as to activate a dialogue with other analogous nodes, energy economy as a whole is obtained that, pooling among several nodes the energy generated and stored in the various nodes, allows a smaller overall resort to the external grid (110). Considering the above, it is inferred that said energy economy is favourable both to the single node (11), and to the grid of nodes (10) and also to the external distribution grid (110), which is more relieved of the time peaks of energy input and/or output.

Figure 5:
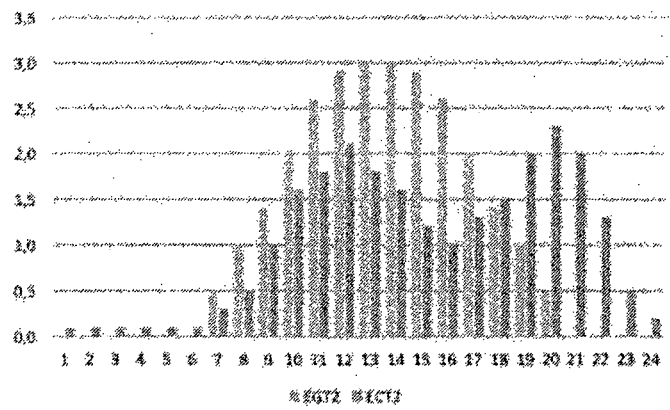
FIG. 5 is a chart relative to the generated electric power (EGT2) and to the consumed power (ECT2), measured in KWh in the 24 hours in a hypothetical Node2, EGT2 being equal to EGT1 on the same day as Node1, as in FIG. 2, but with a different consumption profile.
Figure 6:
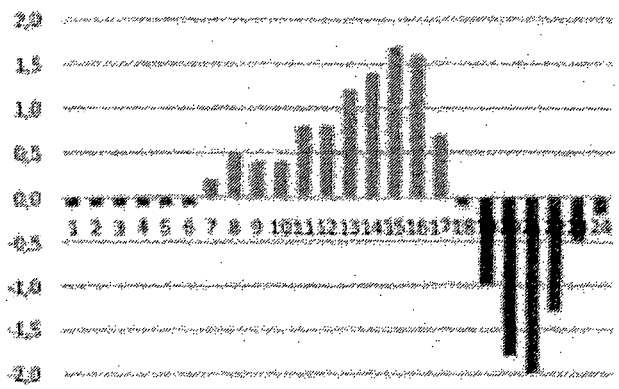
FIG. 6 is a chart relative to the difference between the generated energy (EGT2) and the consumed energy (ECT2) in Node2, as in FIG. 5.
Figure 7:
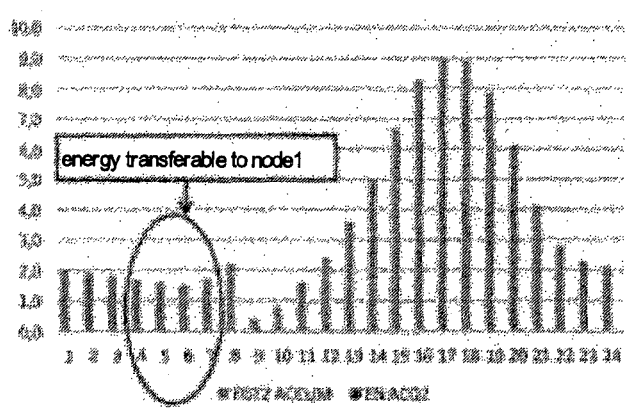
FIG. 7 is a chart relative to the stored electric power (EGT2 ACCUM) with respect to the purchased power (EN ACQ2) in Node2, of FIG. 5, also being equipped with a storage system.

Furthermore, purely by way of example, imagining the hypothesis of a second Node2 characterised, for simplicity, by the same generation profile EGT2=EGT1 but with a different consumption profile ECT2 on the same X day, one may have the situation for said Node2 represented in FIG. 5; in that case, the unbalance between the energy generated and consumed in the Node2 on the X day is shown in FIG. 6. If the Node2, too, were provided with an appropriate energy storage system, as provided by the present patent idea, the situation of energy storage versus energy purchase of the Node2 on the same X day would be that shown in FIG. 7.

In the case in which, on the other hand, the Node1 and the Node2 were also connected in the local grid as provided by the invention, the Node1 could detect that from 4 to 8 o'clock rather than buying energy from the external grid to cover the requirements of ECT1 it may transfer energy generated (possibly from a renewable source), stored and not used by the Node2 that from 4 to 8 o'clock would cover exactly the requirements of the Node1. From such a hypothesis it is inferred that the cost for the energy produced and exchanged by said local grid must be lower than that of the national external distribution grid or such that the balance between energy purchased and sold by the single node is profitable for the node itself. It is thus advantageous for both nodes to equip themselves with the necessary devices, in the ways provided by the invention, in such a way as to connect in the local grid. To this purpose, we remind that the above-described example is purely theoretic, in reality a local grid (10) will be instead made up of several nodes (11) and the connection between nodes will be of the type conventionally called many-to-many, that is to say, each node will be able to interface, directly or by means of other nodes, with several nodes of same grid.

The use of a grid (10) with nodes (11) as described allows to obtain further advantages. For example, we remind that statistically the probability that any of the nodes of the grid is provided with energy stored at the moment Tx is the much higher as greater is the number of interconnected nodes, the average value of generation at the moment Tx of that grid, the overall storage capacity of that grid with respect to the average value of consumption at the moment Tx of that grid. Given the time lag between the consumption profiles there is always a probability greater than zero for a node to find energy stored in the grid, if the generation is not interrupted. In addition to the advantage of finding energy conveniently produced from a renewable source in a local grid, every node (11) therefore enjoys the storage capacity of the other nodes. It results that the sizing of the storage capacity of a single node can be smaller if connected to a grid (10) of such nature with respect to the sizing of the storage capacity in a stand-alone situation, with equal generated and consumed energy.

In addition to what stated above, another important advantage of the connection in the grid of nodes that are simultaneously energy generators, storers and consumers consists in the smaller amount of energy to be transported for medium-long sections, therefore with smaller losses for the national grid and an overall positive balance in terms of energy efficiency.

Another considerable advantage both for the node (11) and, indirectly, for the whole local grid (10) so conceived is the ability of scalability and modularity, that is to say, of growth or decrease of the capacity of generation or storage, and obviously also of consumption, that each node can put into effect at any time without particular restraints but those of the size of the electric cables that support the grid. Said scalability is attainable thanks to the particular dialogue protocol in the grid between each of its components and the intelligence that is provided on each element of energy generation (111), such as the single panel of the smart type, and each energy accumulator (113), such as a single battery of the smart type. Said advantage allows, for example, that at any time the Node X can decide to install an additional generation element and/or an additional storage element with a simple manoeuvre of installation, connection and reset of the software for the control of the system that will immediately see available to the node X the new installed capacity, just as the latter will immediately be seen by the whole local grid to which that Node X belongs.

The above described is valid also for the vice-versa situation: for some operating conditions of diagnosed malfunction or safety such as the overcoming of the voltage and/or current limits, the single Node X can decide according to the protocol implemented in the single components and/or by the control server to disconnect or cancel the generation capacity of each single panel or any generation element, just as it may decide the exclusion of each single storage element. The whole node (11) can be instantaneously excluded from the local grid (10) and/or the single generation elements (111) and/or storage elements (113) can be excluded. The voltage can therefore be lowered to safety values at any moment to the advantage and for the safety of those who might have to intervene on the plant (for example maintenance operators or firemen). Suitable diagnostic and optimization software will opportunely take into account the state of service and of life of each single generation and storage component and will opportunely administer its use to avoid overloads and in the end lower efficiency and/or malfunctions, besides planning programmed and preventive maintenance. Obviously all the functions of diagnostics, control and tele-metering will be possible at the level of the node and of the local grid therefore making extremely transparent and maintainable any element of the grid with evident advantages for the components of the grid.

Figure 8:
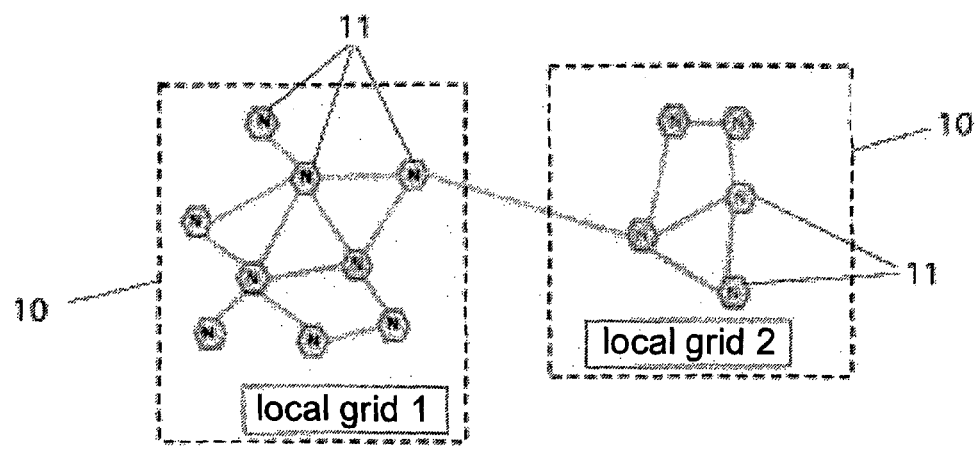
FIG. 8 is a simplified diagram of the grid of local grids formed by the local grid 1 and by the local grid 2, individually comprehensive of a plurality of nodes (N).

An additional considerable advantage both for the node (11), and for the local grid (10), and for the national grid (110) to which the grid can be connected, is the level of constant information in real time of the state of generation, storage and consumption of each single node; such a characteristic, in particular, also allows to realize a grid of local grids. To this purpose, one exploits the possibility of interface and exchange of information and energy between several local grids, where two periphery nodes belonging to two different grids, opportunely connected to each other, can connect two local grids; in general, such solution is allowed to spread progressively realizing said grid of local grids, as represented in FIG. 8 with a purely logical and illustrative diagram. From a theoretical point of view, the two connected grids behave as two nodes in the grid; the exchanges and the rules that will be applied between said nodes in the grid will also be applied between said grids in the grid.

Said node (11), as provided by the invention, presents a particular configuration also with a characteristic equipment being made up of a partial or complete combination of the following devices, which can also be integrated with each other:

the connection to the national low-voltage (220-380V) distribution grid, with relative disconnecting switch and meter;
a system for the generation, for example of the photovoltaic type, with high conversion efficiency and specific low cost of DC electric power;
optimizers of the MPPT type, the conventional acronym of the English terms Maximum Power Point Tracking, being dedicated to each single energy generating element of the node;
a bidirectional inverter for DC/AC conversion and vice-versa;
power factor correction elements of the reactive loads generated by the node;
a solar system, for example of the concentration type, for generating hot water;
an optimized system of electric power storage, for example in appropriate batteries with no environmental impact and a high useful life;
appropriate batteries intended for electric vehicles;
a fluid heat exchanger;
a water source at room temperature;
an insulated storage system of hot water;
one or more discontinuous electrical appliances of variable power;
a metering device of the node electrical loads;
one or more discontinuous thermal appliances of hot water;
a metering device of the node thermal loads;
an electronic system equipped with memory, programmable logic and appropriate software for the monitoring, the dialogue and the management of the elements of generation, storage and consumption of the energy managed in the node that applies the logics provided by the present invention;
an electronic system equipped with memory, programmable logic and appropriate software for the monitoring, the dialogue and the management of the nodes and of the energy exchanges between the nodes.

Figure 9:
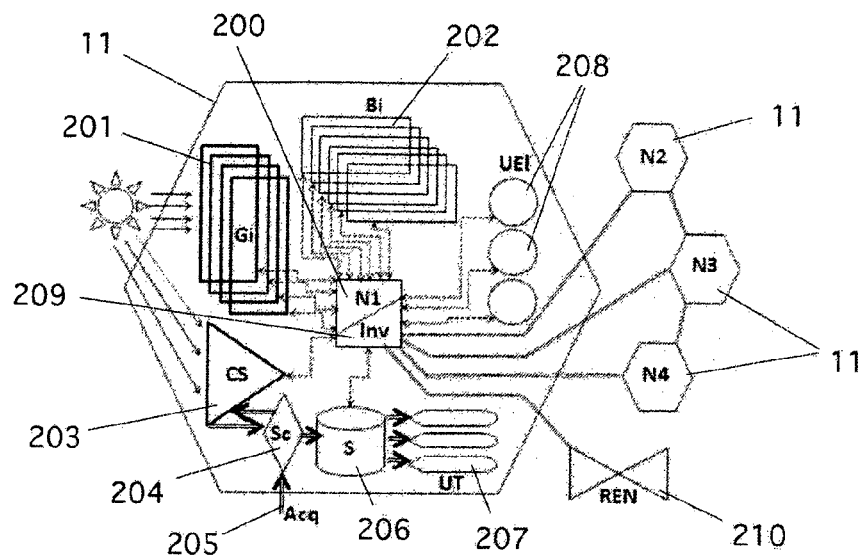
FIG. 9 is a simplified diagram of a possible configuration of a node (N1) and of its controller server, also being connected outside to other nodes (N2, N3, N4) and to the national electricity grid (REN).

For example, (FIG. 9) shows a logical diagram of possible configuration of a node (11) that includes, in addition to the controller device (200) of its own node N1, the following components:

Generators (201) of electric power with advanced intelligence, also conventionally indicated by (Gi);
Appropriate batteries (202) with advanced intelligence for the storage of electric power, also indicated by (Bi);
Concentrator (203) or Thermal Solar Generator of hot water, also indicated by (CS);
Heat Exchanger (204), also indicated by (Sc);
Water source (205), also indicated by (Acq);
Insulated tank (206) for the storage of hot water, also indicated by (S);
Thermal appliances (207), also indicated by (UT);
Electrical appliances (208), also indicated by (UEI);
AC/DC Inverter (209), also indicated by (Inv), which can possibly be integrated in said controller (200);

Interconnected nodes (11), N1 being corresponding to its own Node1, N2 to the Node2, N3 to the Node3, N4 to the Node4;

National grid (210) of low-voltage alternate current, also indicated by (REN).

In particular, the configurations provided for each node (11) are different according to the need or opportunity of generation and consumption and also according to the grid connection made in direct or alternate current, or totally insulated being of the type called off-grid with respect to the national low-voltage electric power distribution grid.

The invention, in particular, provides smart generation elements in such a way as to allow a suitable dialogue capacity with a suitable node external unit, for the purpose of interrogating the single generation element, for example a photovoltaic module, and receive information in real time, for example on its identification, on its life cycle and in particular the number of progressive hours of activity, or on its state of operativeness and power level, instantaneous voltage and current, or still to receive further information necessary for the complete monitoring of said generation element. This dialogue will be of the bidirectional type, in the sense that said generation element can also receive and perform instructions for example to reduce the operational voltage or to totally cut itself off the node or off the grid, or to self-configure in the local grid upon a new installation or re-installation of the generation element in the node.

The invention, just as provided for the single generation element, also provides that smart storage elements are included in said node with similar aims of bidirectional dialogue and control. These storage elements are made in such a way as to allow the necessary capacity of dialogue with a suitable node external unit for the purpose of interrogating the single element and receive information in real time, for example on its identification, on its life and in particular on the number of progressive hours of activity, or on its state of operativeness and power level, instantaneous voltage and current, on the progressive charge-discharge cycles number and other information necessary for the complete monitoring of the single storage element.

Figure 10:
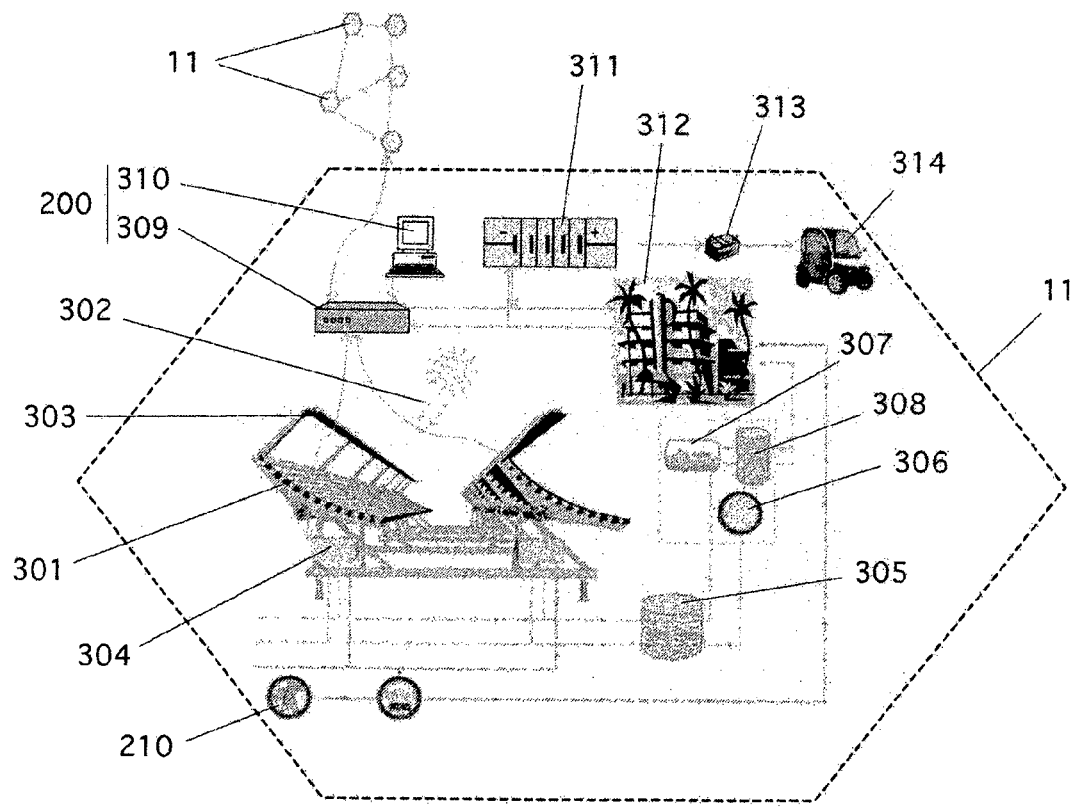
FIG. 10 is a simplified diagram of possible installation, with generation and storage of electric and thermal power.

Set out below are some solutions of a possible configuration of said nodes and of said local grids according to what is provided by the invention, being configurable in a different way mainly according to the need or opportunity of generation and consumption of hot water, or according to the local grid connection in direct or alternate current, by means of the low-voltage national grid, or still in relation to the local grid totally in the mode called off-grid, as described above. As a non-exhaustive example, FIG. 10 schematically shows an installation with the generation and storage of electric power and heat; in more detail, one considers concentration heating elements with electrical and heat co-generation, being characterised by high energy efficiency and installation economy, however the conventional types are suitable as well; the sun during the day irradiates the solar dishes (301) that concentrate the solar beams (302) on the receiving devices (303) comprehensive of a photovoltaic cell system suitable to generate direct electric current, then converted by the inverters (304) into alternate current. On the internal side, said receivers have a duct that carries a cooling fluid that, heated, allows by means of the heat exchanger (305), supplied by the cold water source (306), to introduce heat energy in the circuit that is called of Hot Water, which also can be compensated for in case of need by a conventional plant with a boiler (307) or burner with an insulated accumulator (308). The inverters (304), in particular, are also equipped with an optimization system of the MPPT type. Said inverters dialogue with an interface device (309), also being conventionally called interface and comprising filters and meters, which is managed by software uploaded on the server (310) of the system in such a way as to allow to monitor and control in real time the whole behaviour of the generation system, of the electrical storage system (311), of the consumptions and electrical and thermal appliances of the client site (312). The storage system ensures the charging of batteries characterised by no environmental impact and a high useful life. Said storage, however, can also occur in suitable batteries (313) that are used by electric vehicles (314) provided to said client site (312). Said interface (309) and said server (310) that manages it, operate jointly as a node controller (200) also managing the possible excess or shortage of electric power of the client site, by means of the transfer or the input of the necessary electric power into/from the local grid (10) or from the electricity distribution grid (210). Said excess or requirement is constantly monitored and opportunely balanced.

Figure 11:
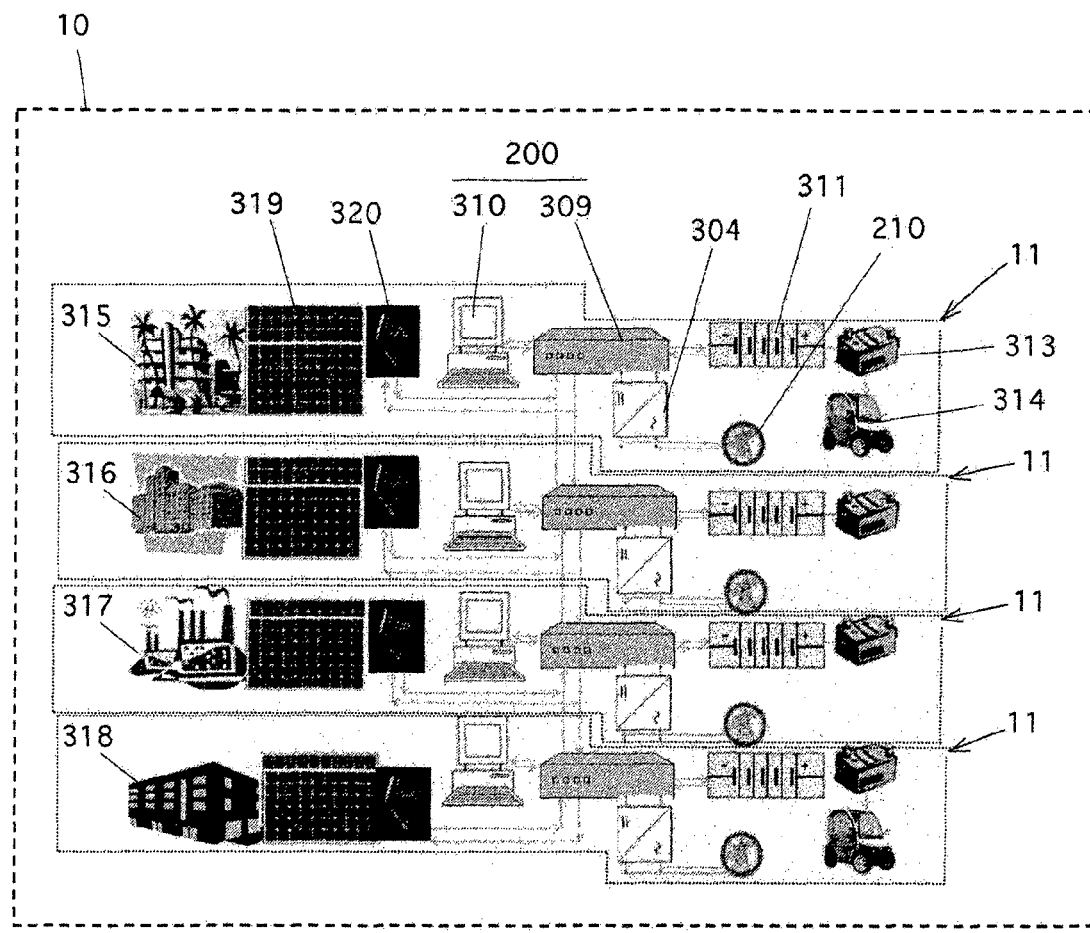
FIG. 11 is a simplified diagram of possible installation, with generation and storage of electric power in a direct current grid (DC grid).

Furthermore as a non-exhaustive example, FIG. 11 schematically shows an alternative installation, with generation and storage of electric power in a direct current grid, conventionally called DC GRID; in more detail, the sun during the day irradiates the photovoltaic modules (319) of advanced generation and equipped with optimizers (320) of the MPPT type that dialogue with an appropriate interface (309) managed by software uploaded on the server (310) of the system that allows to monitor and control in real time the whole behaviour of the generation system, of the electrical storage system (311), of the consumption and electrical and thermal appliances of the client site, being for example a hotel (315), a block of flats (316), a factory (317) or even a hospital (318). Said storage system ensures the charging of suitable smart accumulators (311); if necessary, appropriate accumulators (313) for use on electric vehicles (314) can also be charged. The photovoltaic cells of said modules (319) generate direct current, then stored in the systems (311 and 313) and converted by the inverters (304) into alternate current. The interface (309), being connected to the server (310) in such a way as to substantially realize said node controller (200), also manages the possible excess or shortage of electric power of the client site by means of the transfer or the input of the necessary electric power into/from the electricity distribution grid (210), upon a conversion of the DC/AC type by means of the inverters (304), or, in case of availability of energy in the accumulators in the local grid (10), will draw or transfer the quantity of required or excess energy, on a case-by-case basis. Said excess or requirement is constantly monitored and opportunely balanced, either in the case of transfer/drawing of local or national grid. Therefore, the single interfaces (309) work as smart nodes of said local grid (10), which dialogue with each other and optimize the shared management of the generation of energy by all the modules (319) and of the shared storage of the accumulators (311, 313) according to the consumption profiles of the different appliances (315, 316, 317, 318).

Still as a non-exhaustive example, it is also possible to provide an alternative installation with generation and storage of electric power in an alternate current grid, also called AC grid; this solution schematically corresponds to the previous one (FIG. 11) and the difference consists of the local grid of generators and accumulators that is in an AC grid rather than DC grid.

The invention, in particular, provides that the optimized management of the node (11) according to the above-described modes is performed by a specific electronic apparatus conventionally called node controller (200) or controller server being interfaced both to the devices internal to its own node and externally towards the other nodes of the local grid (10); in particular said node controller (200) is a complex device equipped with at least:

- access gates for the reception and sending of signals from/to the node peripheral devices, of the generators, accumulators and loads type as described above, and also of the signals from/to the other nodes;
- processors and /o microprocessors with high frequencies, from 1 to 100 KHz, for sampling the signals coming from the various above-described input/output gates to which the apparatus is connected, being comprehensive of metering systems;
- processors for the processing of the signals received for the purpose of advantageously managing the behaviour of the node on the basis of particular routine and sub-routine logics, as described in the following;
- memories for the storage of data;
- electronic filters for the elimination of signal interferences;
- remote control switches for remote operations;
- switches and power disconnecting switches proportionate to the node;
- wireless antenna for transmissions with radio-frequency devices;
- sensors for functionality and safety controls.

The invention, therefore, provides that said controller server is connected to the following elements:

- to each generator of its own node;
- to each accumulator of its own node;
- to the meter of the energy that its own node is consuming;
- to every other node connected in the local grid.

In more detail, the invention provides that said node controller manages the system with specific optimization algorithms and specific management logics. Said algorithms, defined and optimizing the behaviour of the node, are mainly based on the sampling in a consistent time interval, conventionally called node past interval or, for simplicity, (ip), with variable window and of the rolling type of the energy consumption profile, or (Ec), that the node is carrying out, by means of a metering system able to characterize its dynamics and, in particular, by means of a polynomial extrapolation or a similar heuristic extrapolation or estimation, to assess its trend in the immediate future, conventionally called node future interval, for simplicity, (if). Therefore, there will be the following relation:

$$Ec(if)=Funz[Ec(ip)]$$

wherein:
- Ec(if) is the estimated value of the energy consumed by the node in the future interval (if) of time;
- Ec(ip) is the measured value of the energy consumed by the node in the past interval (ip) of time;
- Funz, is a predictive function that estimates by extrapolation (Ec) in the future interval (if) from the (Ec) readings sampled in the past interval (ip).

The dimension of the node past interval (ip) can be determined on the basis of pre-reset data or change upon change of the consumption profile of the node, adopting decreasing intervals upon growing of the variability of the consumption profile of the node. The dimension of the future interval (if) is essentially a function of the number of nodes connected to the node to be optimized. The cut-out time of the circuit breaker or differential switch, the cut-out time of the generators, the challenge and response time to/from other nodes in case of requirement will be considered by the controller device. The estimate of the energy consumption Ec(if) that will be made by the node in the future interval (if) is at every moment t recalculated according to the signals received by the meter III and compared with the level of energy present in the accumulators of the node and with the level of energy production of the generators of the node.

In the case in which at the moment t it occurs that:

$$Ec(if)>Cs*[\Sigma Eacc+\Sigma Egen(if)]$$

wherein:
- Ec(if)=estimate of the energy consumed by the node in the future interval (if);
- Cs=safety coefficient (from 0.85 to 0.98);
- $\Sigma Eacc$=summation of the levels of energy contained in the node accumulators at that moment t, net of the minimum level of charge desired for each accumulator, being a datum configurable in the controller of each node;
- $\Sigma Egen(if)$=estimate of the energy generated by the generators of the node in the future interval (if);

then the node, by means of the node controller, must make a request to other energy nodes for the future interval, conventionally called Erich(if), equal to:

$$Erich(if)=Ec(if)-Cs*[\Sigma Eacc+\Sigma Egen(if)]$$

In particular, such energy required for the future interval Erich(if) can be satisfied by one or more nodes. For each of the nodes connected in the local grid, in fact, the node controller will always perform at every moment the calculation of the energy Eced(if) potentially transferable from that node in the future interval if, equal to:

$$Eced(if)=Cs*[\Sigma Eacc+\Sigma Egen(if)]-Ec(if)$$

The condition in which the energy Erich(if)$_n$ required by the node n for the future interval can be satisfied by the local grid made up of a number N of nodes is:

$$Erich(if)_n<\Sigma_x Eced_x(if)$$

with $1\le x\le(n-1)$ and $(n+1)\le x\le N$, and wherein $\Sigma_x$ Eced$_x$ (if) is the summation of the energies transferable in the future interval if from each node x of the local grid (with x that varies from 1 to N, excluding n) as defined above.

Such a condition, when satisfied, will substantially authorize the node n to withdraw the energy Erich(if)$_n$ from the local grid and will opportunely mark the node or nodes that will transfer the energy to the requesting node, also storing the amount of energy received from each single different node connected in the local grid. Vice-versa, in the case in which no other node or sum of nodes connected in the local grid can satisfy in the future interval (if) the energy requirement of the node n, the controller of the node n will draw Erich(if)$_n$ from the national or municipal electricity distribution grid, conventionally called utility, to which the node is connected.

At the end of the period, typically at monthly intervals, for each node one will calculate:
- the amount of energy received from the local grid, with the possibility of crosscheck as each node has stored in credit the energy transferred and to which node;
- the amount of energy transferred to the local grid, with the possibility of crosscheck as each node has stored in debit the energy received and from which node;
- the amount of energy produced and self-consumed;
- the amount of energy received from the utility grid to which the node is connected.

In particular, the optimized management of the energy exchange between the single nodes occurs by means of the relative node controllers, interconnected to each other. In more detail, among the management logics of said controllers, we point out that in the case in which there is an energy exchange between nodes of the local grid, that is to say, when at the moment t the above-described conditions are simultaneously satisfied:

Erich(if)$_n$>0

Erich(if)$_n$<$\Sigma_x$ Eced$_x$ (if)

with $1 \leq x \leq (n-1)$ and $(n+1) \leq x \leq N$, then the energy Erich(if)$_n$ required by the node n for the future interval (if) can be drawn from the local grid made up of a number N of nodes and addressed to the requesting node n. Remembering that the nodes suitable to transfer energy to the node n in the future interval (if) are those for which at the moment t it occurs that: Eced(if)>0. The choice of which node or nodes identify as suppliers of the whole or part of the Erich(if)$_n$ required by node n for the future interval (if), will be based on the appropriate combination of the following criteria assessed at the moment t and counting in the following order:

1) distance from the requesting node n from the node/nodes suitable to transfer energy, the smallest distance winning;
2) amount of energy Eced(if) transferable at the moment t by the node/nodes suitable to transfer energy, the greatest amount winning.

Such criteria imply that, among all the nodes suitable to transfer energy to the node n, the node from which more energy will be drawn will be the one closest to the node n; with equal distance, the next criterion will be the greater availability of transferable energy. This criterion being equal too, the choice will occur randomly.

In the case in which at the moment t more than one node simultaneously requests energy to the local grid, the choice of which node supply first will be based on the following criteria, counting in the following order:

1) condition of connection or non-connection at the moment t of the requesting node to the national or municipal electricity distribution grid, the non-connected winning;
2) generation capacity installed and active at the moment t in the node, the greatest power winning;
3) storage capacity installed and active at the moment t in the node, the greatest storage capacity winning.

Such criteria imply that, among all the nodes requiring energy at the moment t, the node to which energy will be supplied first will be the one not connected in that moment to the national or municipal electricity distribution grid; with this condition being equal, both connected and non-connected, the next criterion will choose the node that has installed the greatest power of generators, and finally, with equal installed power, the one with the greatest storage capacity installed. This criterion being equal too, the choice will occur randomly.

A characteristic that distinguishes each of the nodes (11) being part of a local grid (10) as described above, is the capability to self-configure at any time. That is to say, the controller (200) of each node n, in addition to the previously described functions and to the constant control of the consumption profile of the node n, constantly monitors, in each moment t, various information such as:

number of working and active generators connected to the node n;
current and voltage values generated by each generator connected to the node n;
number of hours of operation of each generator connected to the node n;
possible signals from temperature sensors placed in each generator connected to the node n;
number of working and active accumulators connected to the node n and their maximum charge value;
state of charge, in terms of percentage with respect to the maximum charge, of each accumulator connected to the node n;
number of hours of operation of each accumulator connected to the node n;
number of charge/discharge cycles of each accumulator connected to the node n;
possible signals from temperature sensors placed in each accumulator connected to the node n;
number of other nodes connected to the local grid to which the node n is connected and their localization coordinates, being mainly aimed to the calculation of the relative distance from node to node.

Moreover, said values can dynamically change in time by means of at least one of the following operating conditions: connection of new nodes to the local grid, exclusion for safety or maintenance reasons of one or more nodes from the local grid, installation of new generators with one or more nodes, exclusion for safety or maintenance reasons of one or more generators with one node, installation of new accumulators with one or more nodes, exclusion for safety or maintenance reasons of one or more accumulators with one node, disconnection of one or more nodes from the national or municipal electricity distribution grid. From everything stated above it is inferred, therefore, that the controller (200) of each node must constantly self-configure on the basis of the peripheral situations of its own node and of the other nodes for the purpose of being up-to-date and able to make the previously described optimization choices in the light of the changed conditions and applying on a case-by-case basis the logics described in following according to the corresponding state condition.

Figure 12A:
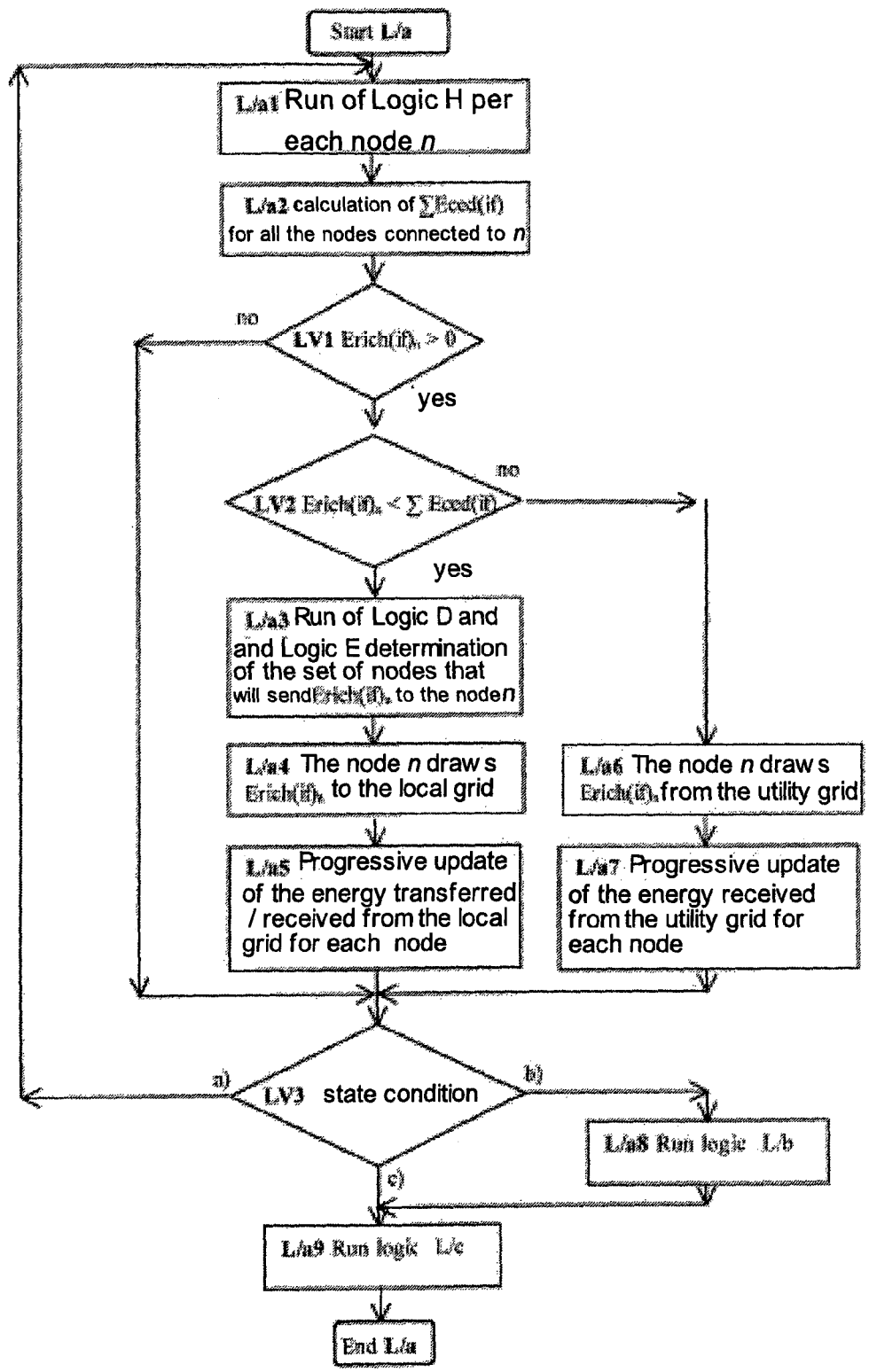
FIG. 12a is a flowchart of the management logic (L/a) of the single node n by the node controller server, in relation to the state condition (a), as in FIG. 1a, that is to say, simultaneously connected to the local grid and to said utility grid.
Figure 12B:
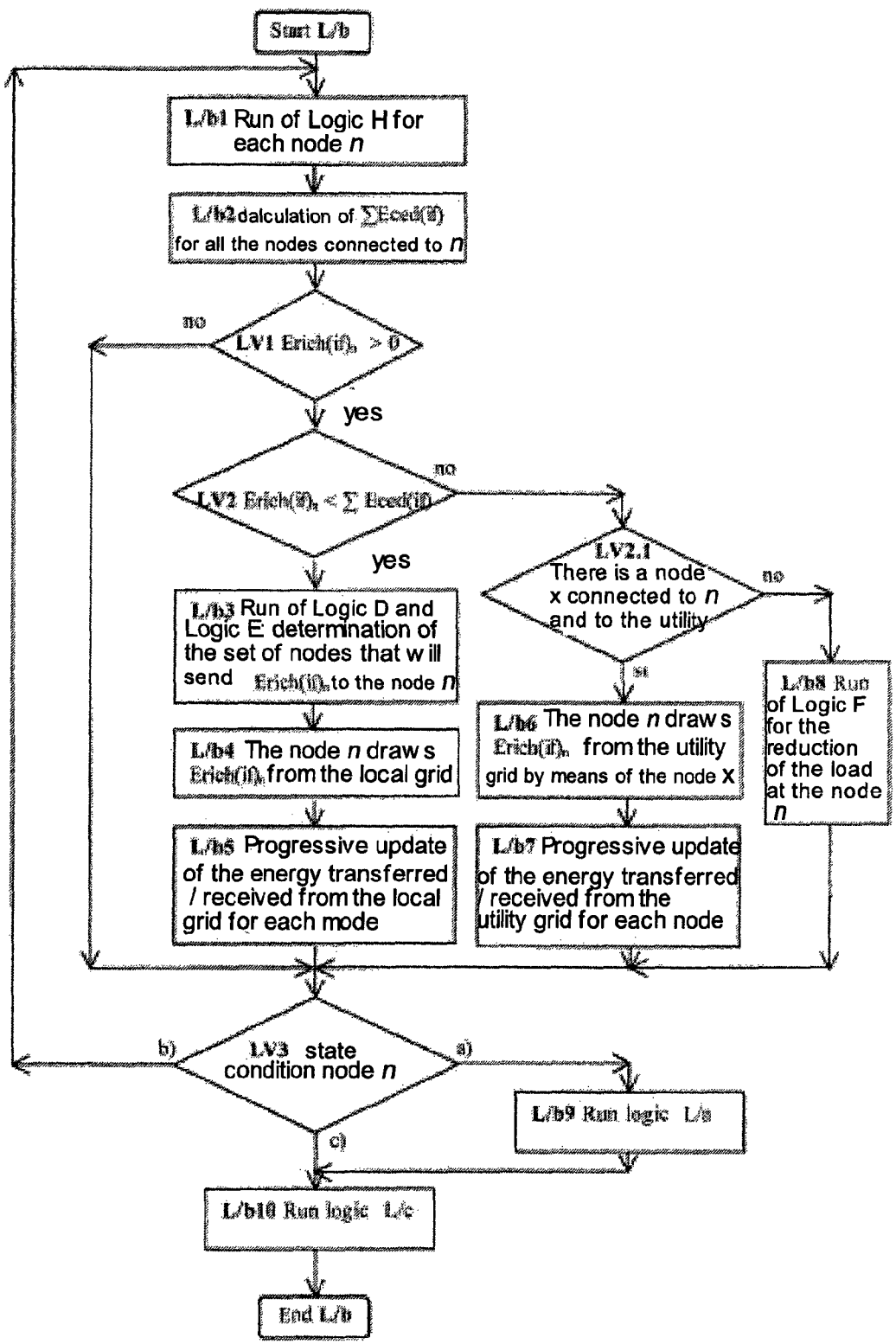
FIG. 12b is a flowchart of the management logic (L/b) of the single node n by the node controller server, in relation to the state condition (b), as in FIG. 1b, that is to say, connected to the local grid only.
Figure 12C:
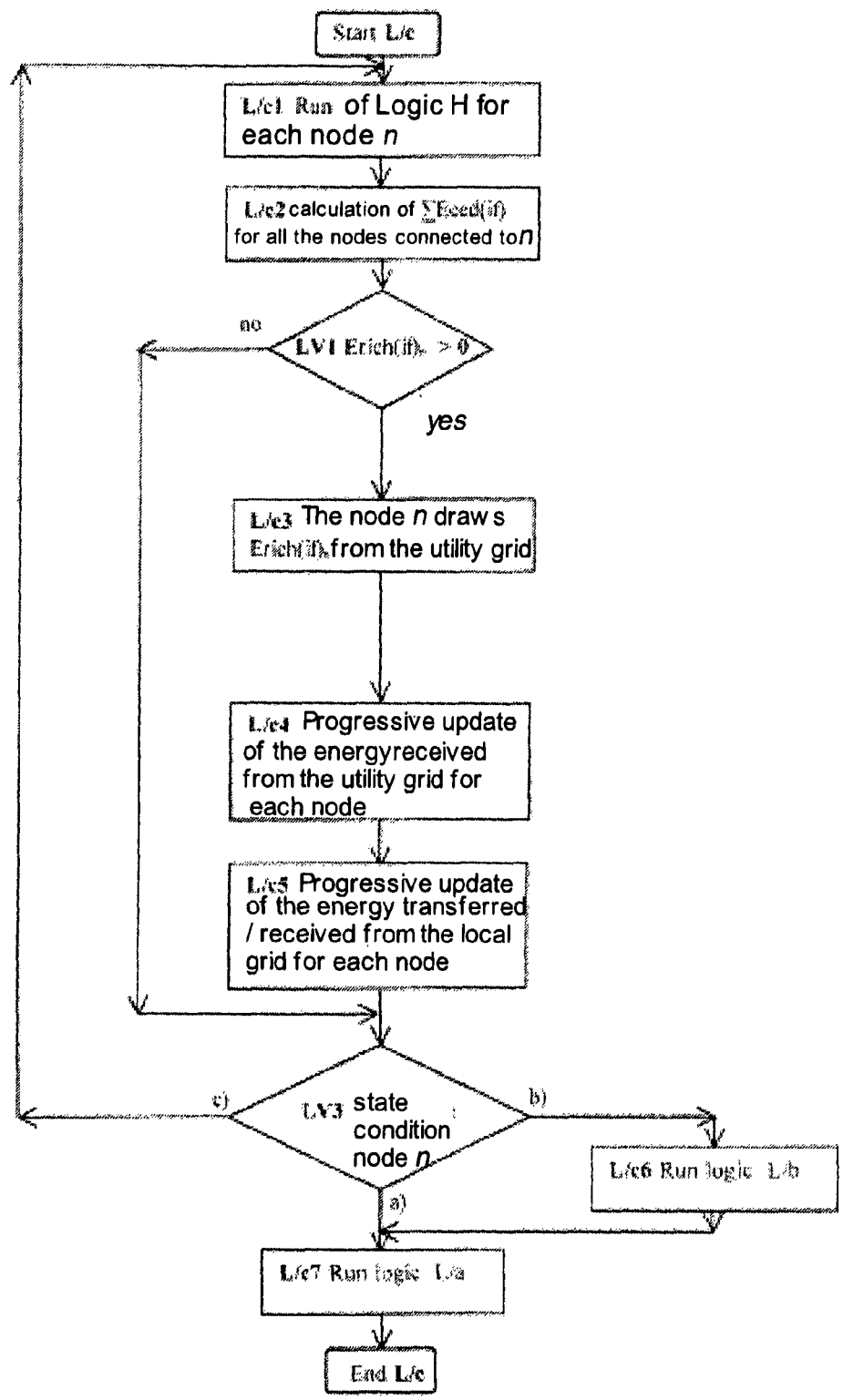
FIG. 12c is a flowchart of the management logic (L/c) of the single node n by the node controller server, in relation to the state condition (c), as in FIG. 1c, that is to say, temporarily connected to the utility grid only.
Figure 13:
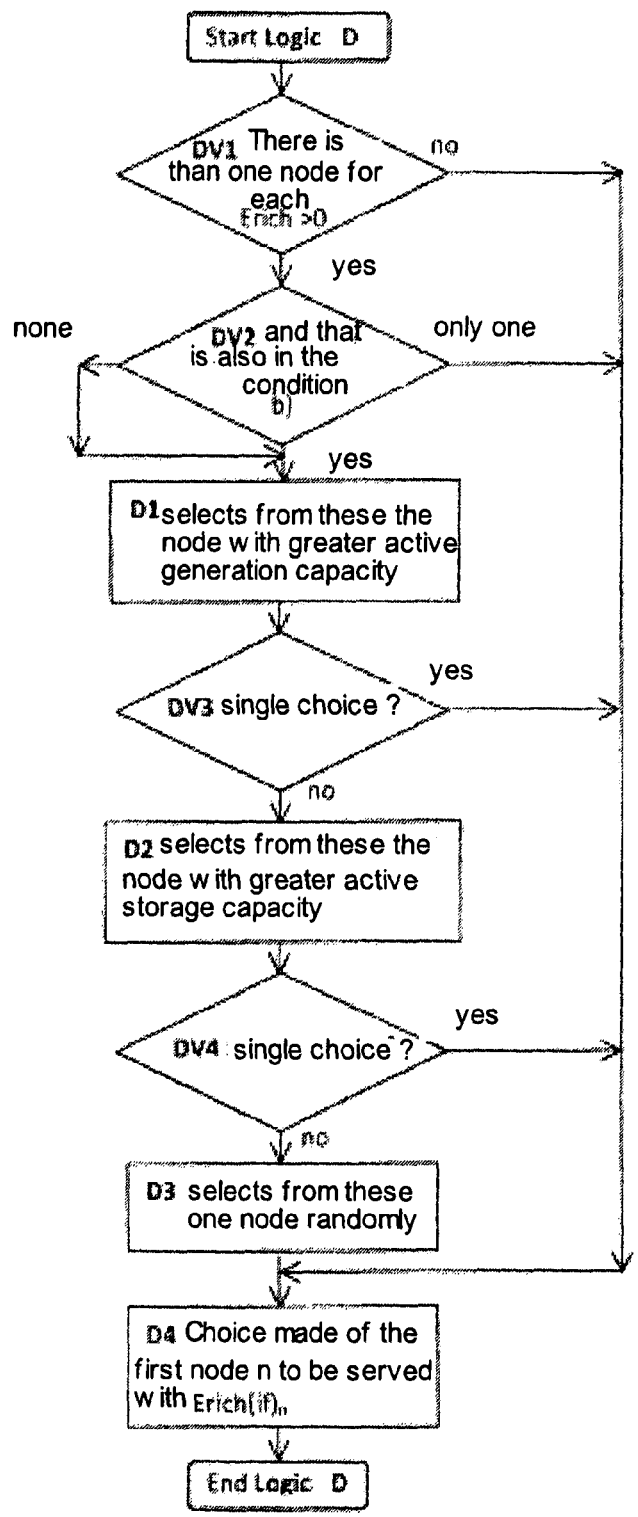
FIG. 13 is a flowchart of the determination logic (Logic D) of the first node n to be served with Erich(if).
Figure 14:
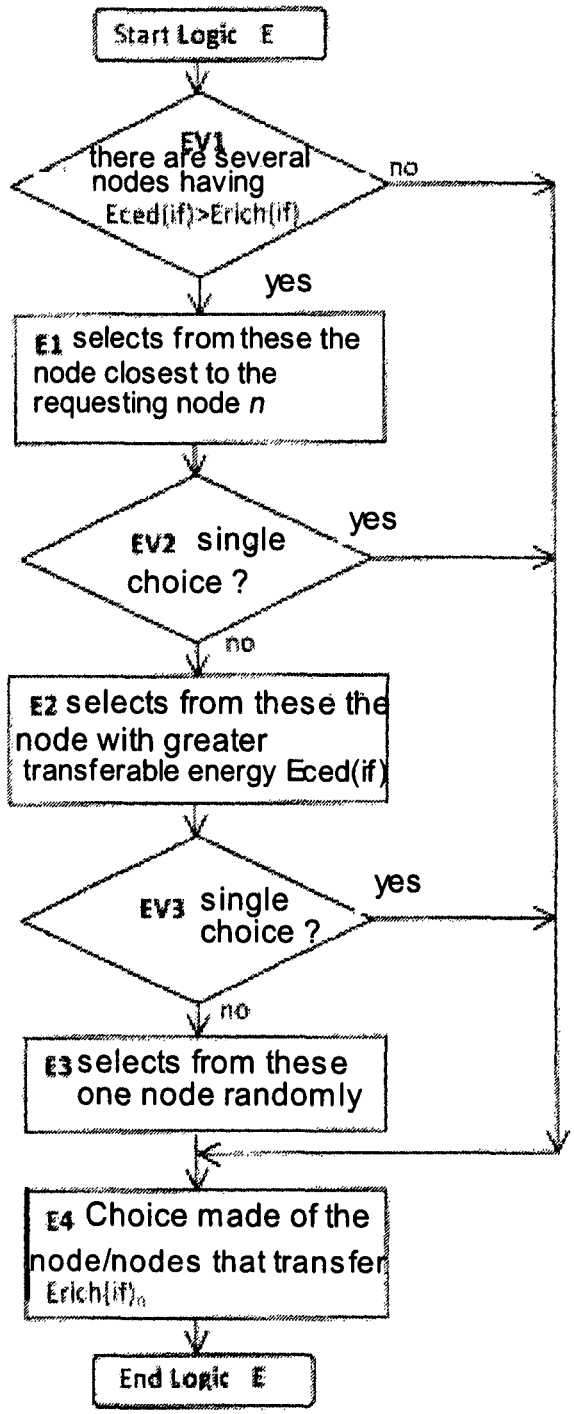
FIG. 14 is a flowchart of the selection logic (Logic E) of the node/of the nodes that transfer Erich(if) to the node n.
Figure 15:
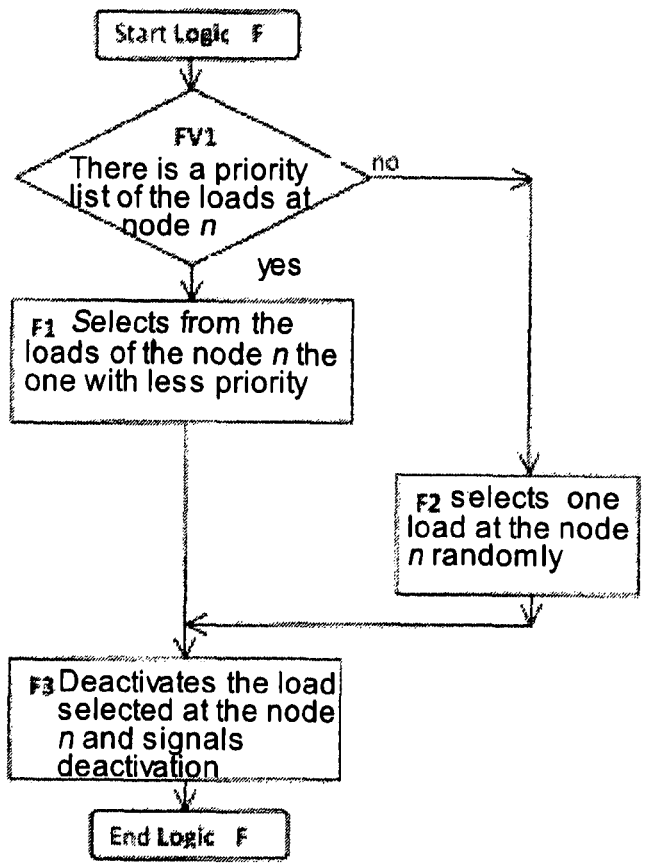
FIG. 15 is a flowchart of the logic of reduction and exclusion of the loads (Logic F) at the node n.
Figure 16:
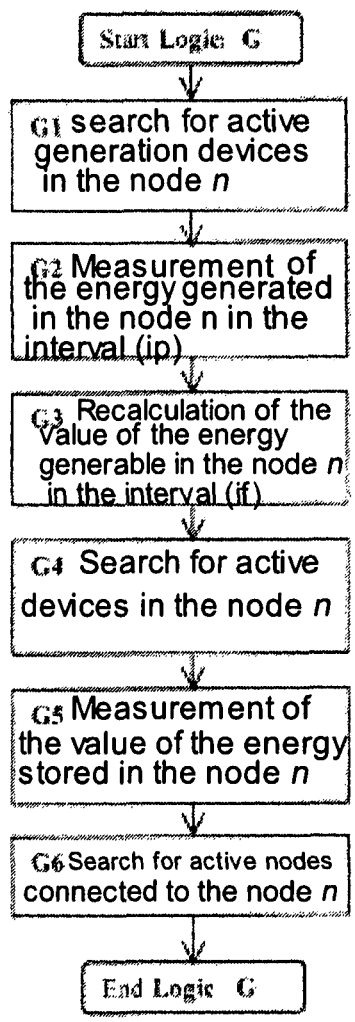
FIG. 16 is a flowchart of the self-configuration logic (Logic G) by the controller server of each single node n.
Figure 17:
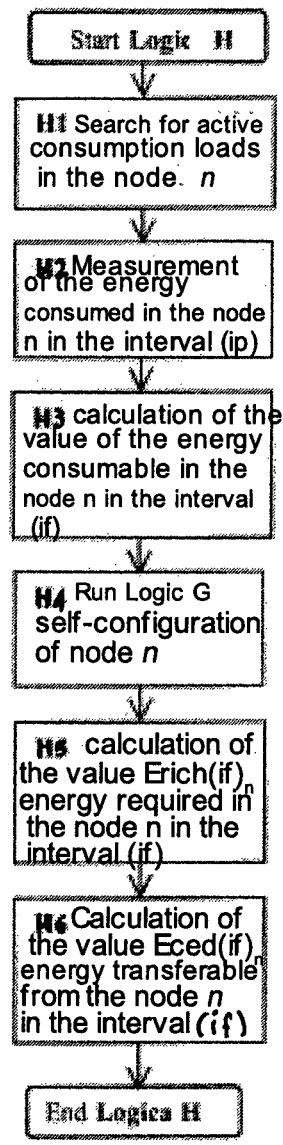
FIG. 17 is a flowchart of the logic of calculation of energy availability or requirement (Logic H) of each node n.

In order to allow each node controller (200) to manage in an optimized way such a complexity of connections and information, also in relation to said variable configurations, the invention provides the application of specific management logics, of the type conventionally called optimization algorithm or even routine in the English language, said logics being respectively called Logic L/a, Logic L/b, Logic L/c (FIGS. 12a-12c) according to the different state conditions; furthermore, said management logics are intended to regulate the variability and the dynamism of the system by means of sub-logics having specific aims, being substantially some procedures of the sub-routine type, which are conventionally Logic D, Logic E, Logic F, Logic G, Logic H (FIGS. 13-17) respectively, described in detail in the following.

In particular, said management logics L/a, L/b, L/c refer to the three main state conditions of the node connection, as described above, L/a (FIG. 12a) being referred to the first state condition, or condition a, where the single node is simultaneously connected to said local grid and also to the utility grid (FIG. 1a); and where L/b (FIG. 12b) refers to, the second state condition or condition b, with the single node connected to the local grid only, permanently or temporarily (FIG. 1b); and where L/c (FIG. 12c) refers to the third state condition, or condition c, with the single node connected temporarily to the utility grid only (FIG. 1c).

The diagrams as in FIGS. 12-17, therefore, refer to what has been described above and represent in phases, in the simplified form of the flowchart, the operating sequence of the activities and of the checks, conventionally called Phases and Check phases, respectively, which characterize said management logics and said sub-logics, being correlated to each other as well; in particular, said phases are variously combined as the whole system is variable in the configuration and dynamic in the behaviour, as described above. In more detail, said management logic L/a includes at least the following activities and checks with particular correlations as shown by the arrows in the diagram (FIG. 12a):

Start) Start of the procedure called L/a;

Phase L/a1) Launch, or Run, of the Logic H for each node n;

Phase L/a2) Calculation of $\Sigma Eced(if)$ for all the nodes connected to the node n;

Check phase LV1) Checks if $Erich(if)_n > 0$: yes or no? If it respects the majority condition (yes) it accesses the Check phase LV2, if it does not respect said condition (no) it accesses the Check phase LV3;

Check phase LV2) Checks if $Erich(if)_n < \Sigma Eced(if)$: yes or no? If it respects the minority condition (yes) it accesses the Phase L/a3, if it does not respect said condition (no) it accesses the Phase L/a6;

Phase L/a3) Launch, or Run, of the Logic D and Logic E with the determination of the set of nodes that will send $Erich(if)_n$ to the node n;

Phase L/a4) The node n draws $Erich(if)_n$ from the local grid;

Phase L/a5) Progressive update of the energy transferred/received from the local grid for each node;

Check phase LV3) Check of the state condition of the node n: condition a) or b) or c)? If it respects the first state condition (a) it accesses the Phase L/a1, if it respects the second state condition (b) it accesses the Phase L/a8, if it respects the third of state condition (c) it accesses the Phase L/a9;

Phase L/a6) the node n draws $Erich(if)_n$ from the utility grid;

Phase L/a7) Progressive update of the energy received from the utility grid for each node, with subsequent access to the Check phase LV3;

Phase L/a8) Launch, or Run, of the Management logic L/b;

Phase L/a9) Launch, or Run, of the Management logic L/c;

End) End of the procedure called L/a.

In a similar way, said Management logic L/b includes at least the following activities and checks, new or also corresponding to the previous one, with particular correlations as shown by the arrows in the diagram (FIG. 12b):

Start) Start of the procedure called L/b;

Phase L/b1=Phase L/a1)

Phase L/b2=Phase L/a2)

Check phase LV1) like for L/a;

Check phase LV2) like for L/a, but with different results: if it respects the minority condition (yes) it accesses the phase L/b3, if it does not respect said condition (no) it accesses the Check phase LV2.1

(New) Check phase LV2.1) There is a node x connected to the node n and to the utility: yes or no? If it respects the existence condition (yes) it accesses the Phase L/b6, if it does not respect said condition (no) it accesses the Phase L/b8;

Phase L/b3=Phase L/a3)

Phase L/b4=Phase L/a4)

Phase L/b5=Phase L/a5)

Check phase LV3) like for L/a, but with different results: if it respects the first state condition (a) it accesses the Phase L/b9, if it respects the second state condition (b) it accesses the Phase L/b1, if it respects the third state condition (c) it accesses the Phase L/b10;

(New) Phase L/b6) The node n draws $Erich(if)_n$ from the utility grid by means of the node x;

(New) Phase L/b7) Progressive update of the energy received from the utility grid for each node, with subsequent access to the Check phase LV3;

(New) Phase L/b8) Launch, or Run, of the Logic F for reduction of the load at the node n, with subsequent access to the Check phase LV3;

(New) Phase L/b9=Launch, or Run, of the Management logic L/a;

Phase L/b10=Phase L/a9)

End) End of the procedure called L/b.

Furthermore, said Management logic L/c includes at least the following activities and checks, new or also corresponding to the previous ones, with particular correlations as shown by the arrows in the diagram (FIG. 12c):

Start) Start of the procedure called L/c;

Phase L/c1=Phase L/b1=Phase L/a1)

Phase L/c2=Phase L/b2=Phase L/a2)

Check phase LV1) like for L/a and L/b but with different results: if it respects the majority condition (yes) it accesses the Phase L/c3, if it does not respect said condition (no) it accesses the Check phase LV3;

(New) Phase L/c3) The node n draws $Erich(if)_n$ from the utility grid;

(New) Phase L/c4) Progressive update of the energy received from the utility grid for each node;

Phase L/c5=Phase L/b5=Phase L/a5)

Check phase LV3) like for L/a and L/b, but with different results: if it respects the first state condition (a) it accesses the Phase L/c7, if it respects the second state condition (b) it accesses the Phase L/c6, if it respects the third state condition (c) it accesses the Phase L/c1;

Phase L/c6=Phase L/a8)

(New) Phase L/c7) Launch, or Run, of the Management logic L/a;

End) End of the procedure called L/c.

With reference to the above-mentioned activities, one specifically defines said sub-logics of the sub-routine type called Logic D, Logic E, Logic F, Logic G, Logic H being described in the following also with reference to the flow-charts as in FIGS. 13-17. In particular, the Logic D of determination of the first node n to be served with $Erich(if)_n$ includes at least the following activities and checks with particular correlations as shown by the arrows in the diagram (FIG. 13):

Start) Start of the procedure called Logic D;

Check phase DV1) Is there more than one node for which Erich>0? yes or no? if it respects the existence condition (yes) it accesses the Check phase DV2, if it does not respect said condition (no) it accesses the Phase D4;

Check phase DV2) And that is also in the condition b): yes, only one or none? if more than one node respects this state condition (yes) it accesses the Phase D1, if only one node respects it (only one) it accesses the Phase D4, if no node respects it (none) it accesses the Phase D1;

Phase D1) Selects from these the node with greater active generation capacity;

Check phase DV3) Single choice: yes or no? if it respects the singleness condition (yes) it accesses the Phase D4, if it does not respect said condition (no) it accesses the Phase D2;

Phase D2) Selects from these the node with greater active storage capacity;

Check phase DV4) Single choice: yes or no? if it respects the singleness condition (yes) it accesses the Phase D4, if it does not respect said condition (no) it accesses the Phase D3;

Phase D3) Selects from these one node randomly;

Phase D4) Choice made of the first node n to be served with Erich(if)$_n$;

End) End of the procedure called Logic D.

Furthermore, the Logic E of choice of the node/nodes that transfer Erich(if) to the node n includes at least the following activities and checks with particular correlations as shown by the arrows in the diagram (FIG. 14):

Start) Start of the procedure called Logic E;

Check phase EV1) There are several nodes having Eced (if)>Erich(if): yes or no? if it respects the existence condition (yes) it accesses the Phase E1, if it does not respect said condition (no) it accesses the Phase E4;

Phase E1) Selects from these the node closest to the requesting node n;

Check phase EV2) Single choice: yes or no? if it respects the singleness condition (yes) it accesses the Phase E4, if it does not respect said condition (no) it accesses the Phase E2;

Phase E2) Selects from these the node with greater transferable energy Eced(if);

Check phase EV3) Single choice: yes or no? if it respects the singleness condition (yes) it accesses the Phase E4, if it does not respect said condition (no) it accesses the phase E3;

Phase E3) Selects from these one node randomly;

Phase E4) Choice made of the node/nodes that transfer Erich(if)$_n$;

End) End of the procedure called Logic E.

The logic F of reduction and exclusion of the loads at the node n, on the other hand, includes at least the following activities and checks with particular correlations as shown by the arrows in the diagram (FIG. 15):

Start) Start of the procedure called Logic F;

Check phase FV1) There is a priority list of the loads at the node n: yes or no? if it respects the existence condition (yes) it accesses the Phase F1, if it does not respect said condition (no) it accesses the Phase F2

Phase F1) Selects from the loads of the node n the one with less priority, then accesses the Phase F3;

Phase F2) Selects one load at the node n randomly;

Phase F3) Deactivates the load selected at the node n and signals the deactivation;

End) End of the procedure called Logic F.

Furthermore, the Logic G of self-configuration by the controller server of each single node includes at least the following consequential activities, as shown in the diagram (FIG. 16):

Start) Start of the procedure called Logic G;

Phase G1) Search for active generation devices in the node n;

Phase G2) Measurement of the energy generated in the node n in the interval (ip):

Phase G3) Recalculation of the energy generable in the node n in the interval (if);

Phase G4) Search for active storage devices in the node n;

Phase G5) Measurement of the value of the energy stored in the node n;

Phase G6) Search for the active nodes connected to the node n;

End) End of the procedure called Logic G.

The Logic H of calculation of the energy availability or requirement of each node n includes at least the following consequential activities, as shown in the diagram (FIG. 17):

Start) Start of the procedure called Logic H;

Phase H1) Search for the active consumption loads in the node n;

Phase H2) Measurement of the energy consumed in the node n in the interval (ip);

Phase H3) Calculation of the energy consumable in the node n in the interval (if);

Phase H4) Run Logic G of self-configuration node n;

Phase H5) Calculation of the value Erich(if)$_n$ energy required in the node n in the interval (if);

Phase H6) Calculation of the value Eced(if)$_n$ energy transferable from the node n in the interval (if);

End) End of the procedure called Logic H.

REFERENCE

(10) Local grid
(11) node
(110) utility grid
(111) generation elements
(112) consumption elements
(113) storage elements
(200) node controller
(201) generators of electric power with integrated intelligence
(202) storage batteries with integrated intelligence
(203) solar concentrator
(204) heat exchanger
(205) water source
(206) insulated tank
(207) thermal appliances
(208) electrical appliances
(209) inverter
(210) national electricity grid
(301) concentration dish
(302) sunrays
(303) receiver with cells
(304) inverter
(305) exchanger
(306) cold water source
(307) boiler
(308) insulated tank
(309) interface device, comprehensive of filters and meters; it is part of the node controller (200)
(310) server; it is part of the node controller (200)
(311) electrical storage
(312) generic client site
(313) battery for electric vehicle
(314) electric vehicle
(315) client site of the hotel type
(316) client site of the block of flats type
(317) client site of the factory type
(318) client site of the hospital type
(319) photovoltaic module
(320) MPPT optimizer

The invention claimed is:

1. Architecture system of a local grid (10) made up of at least two nodes (11), characterised in that the nodes constitute single micro-grids of the energy producer consumer storer type, each of said micro-grids (11) being managed by an electronic and self-configurable node controller (200); and wherein said controller (200) is connected to the single controllers of the other nodes and also to the single energy generation (111), storage (113) and consumption elements (112) of its own node, said elements being variable in their configuration and dynamic in their behaviour in at least one of the provided state conditions (a), (b) and (c), just as the single node (11) and said local grid (10) can be variable and dynamic; and wherein each node is able to control simultaneously and dynamically, according to the instantaneous configuration, the consumption, the generation and the storage of energy; and wherein each node has the capability of communication, of the type conventionally called one-to-one, and of optimization of the conditions and state of service of each of its own generators and accumulators, it being possible to add or exclude them at any moment; and where the controller (200) of the single node manages at least one of the three following state conditions: a first condition (a) in which the single node (11) is simultaneously connected to said local grid (10) and also to the utility grid (110), or a second state condition (b) in which it is connected to the local grid only (10), or another third condition (c) in which it is temporarily connected to the utility grid only (110); and wherein said node controller (200), for each of said cases, optimizes the energy transfers according to a specific management logic of the routine type called respectively L/a, if referred to the first state condition (a), or L/b if referred to the second condition (b), or still L/c if referred to the third condition (c); and wherein said management logics L/a, L/b and L/c also refer to some sub-logics of the sub-routine type having specific functions and that are respectively called Logic D, Logic E, Logic F, Logic G and Logic H; and wherein the operating sequence of said logics of the routine and sub-routine type include a plurality of activities and checks, called Phases and Check phases respectively, which are correlated and variously combined with respect to each other in such a way as to allow an optimized management of said micro-grids, connected to each other as well, in a system of the type variable in the configuration and dynamic in the behaviour.

2. Architecture system of a local grid (10) according to claim 1, characterised in that said Management logic L/a includes at least the following Phases and Check phases:
Start L/a);
Phase L/a1) Run Logic H for each node n;
Phase L/a2) Calculation of $\Sigma$Eced(if) for nodes connected to the node n;
Check phase LV1) Checks if Erich(if)$_n$>0: if (yes) it accesses LV2, if (no) it accesses LV3;
Check phase LV2) Checks if Erich(if)$_n$<$\Sigma$Eced(if): if (yes) it accesses L/a3, if (no) it accesses L/a6;
Phase L/a3) Run of Logic D and Logic E with the determination of the set of nodes that will send Erich (if)$_n$ to the node n;
Phase L/a4) The node n draws Erich(if)$_n$ from the local grid;
Phase L/a5) Progressive update of the energy transferred/received from the local grid for each node;
Check phase LV3) Check of the state condition of the node n: if it respects the first condition (a) it accesses L/a1, if it respects the second condition (b) it accesses L/a8, if it respects the third condition (c) it accesses L/a9;
Phase L/a6) The node n draws Erich(if)$_n$ from the utility grid;
Phase L/a7) Progressive update of the energy received from the utility grid for each node, with access to LV3;
Phase L/a8) Run Management logic L/b, then accesses L/a9;
Phase L/a9) Run Management logic L/c;
End L/a).

3. Architecture system of a local grid (10) according to claim 1, characterised in that said Management logic L/b includes at least the following Phases and Check phases:
Start L/b);
Phase L/b1=Phase L/a1);
Phase L/b2=Phase L/a2);
Check phase LV1) like for L/a;
Check phase LV2) like for L/a, but with different results: if (yes) it accesses L/b3, if (no) it accesses LV2,1;
Check phase LV2.1) There is a node x connected to the node n and to the utility: if (yes) it accesses L/b6, if (no) it accesses L/b8;
Phase L/b3=Phase L/a3);
Phase L/b4=Phase L/a4);
Phase L/b5=Phase L/a5);
Check phase LV3) like for L/a, but with different results; if (a) it accesses L/b9, if (b) it accesses L/b1, if (c) it accesses L/b10;
Phase L/b6) The node n draws Erich(if)$_n$ from the utility grid by means of the node x;
Phase L/b7) Progressive update of the energy received from the utility grid for each node, with access to LV3;
Phase L/b8) Run Logic F for the reduction of the load at the node n, with access to LV3;
Phase L/b9=Run Management logic L/a, then it accesses L/b10;
Phase L/b1 0=Phase L/a9);
End L/b).

4. Architecture system of a local grid (10) according to claim 1, characterised in that said Management logic L/c includes at least the following Phases and Check phases:
Start L/c);
Phase L/c1=Phase L/b1=Phase L/a1);
Phase L/c2=Phase L/b2=Phase L/a2);
Check phase LV1) like for L/a and L/b but with different results: if (yes) it accesses L/c3, if (no) it accesses LV3;
Phase L/c3) The node n draws Erich(if)$_n$ from the utility grid;
Phase L/c4) Progressive update of the energy received from the utility grid for each node;
Phase L/c5=Phase L/b5=Phase L/a5);
Check phase LV3) like for L/a and L/b, but with different results: if (a) it accesses L/c7, if (b) it accesses L/c6, if (c) it accesses L/c1; Phase L/c6) Run Management logic L/b, then it accesses L/c7;
Phase L/c7) Run Management logic L/a;
End L/c).

5. Architecture system of a local grid (10) according to claim 1, characterised in that said Logic D is of determination of the first node n to be served with Erich(if)$_n$ and includes at least the following Phases and Check phases:
Start Logic D);
Check phase DV1) Is there more than one node for which Erich>0? if (yes) it accesses DV2, if (no) it accesses D4;
Check phase DV2) And that is also in the condition b): if more than one node (yes) it accesses D1, if only one node (only one) it accesses D4, if no node (none) it accesses D1;
Phase D1) Selects from these the node with greater active generation capacity;
Check phase DV3) Single choice: if (yes) it accesses D4, if (no) it accesses D2;
Phase D2) Selects from these the node with greater active storage capacity;
Check phase DV4) Single choice: if (yes) it accesses D4, if (no) it accesses D3;

Phase D3) Selects from these one node randomly;
Phase D4) Choice made of the first node n to be served with Erich(if)$_n$;
End Logic D).

6. Architecture system of a local grid (10) according to claim 1, characterised in that said Logic E is of choice of the node/nodes that transfer Erich(if) to the node n and includes at least the following Phases and Check phases:
Start Logic E);
Check phase EV1) There are several nodes having Eced (if)>Erich(if): if (yes) it accesses E1, if (no) it accesses E4;
Phase E1) Selects from these the node closest to the requesting node n;
Check phase EV2) Single choice: if (yes) it accesses E4, if (no) it accesses E2;
Phase E2) Selects from these the node with greater transferable energy Eced(if);
Check phase EV3) Single choice: if (yes) it accesses E4, if (no) it accesses E3;
Phase E3) Selects from these one node randomly;
Phase E4) Choice made of the node/nodes that transfer Erich(if)n; •End Logic E).

7. Architecture system of a local grid (10) according to claim 1, characterised in that said Logic F is of reduction and exclusion of the loads at the node n and includes at least the following Phases and Check phases:
Start Logic F);
Check phase FV1) There is a priority list of the loads at the node n: if (yes) it accesses F1, if (no) it accesses F2;
Phase F1) Selects from the loads of the node n the one with less priority, then accesses F3;
Phase F2) Selects one load at the node n randomly, then accesses F3;
Phase F3) Deactivates the load selected at the node n and signals the deactivation;
End Logic F).

8. Architecture system of a local grid (10) according to claim 1, characterised in that said Logic G is of self-configuration by the controller server of each single node and includes at least the following consequential Phases:
Start Logic G);
Phase G1) Search for active generation devices in the node n;
Phase G2) Measurement of the energy generated in the node n in the interval (ip):
Phase G3) Recalculation of the value of the energy generable in the node n in the interval (if);
Phase G4) Search for active storage devices in the node n;
Phase G5) Measurement of the value of the energy stored in the node n;
Phase G6) Search for the active nodes connected to the node n;
End Logic G).

9. Architecture system of a local grid (10) according to claim 1, characterised in that said Logic H is of calculation of the energy availability or requirement of each node n and includes at least the following consequential Phases:
Start Logic H);
Phase H1) Search for active consumption loads in the node n;
Phase H2) Measurement of the energy consumed in the node n in the interval (ip);
Phase H3) Calculation of the energy consumable in the node n in the interval (if);
Phase H4) Run Logic G of self-configuration node n;
Phase H5) Calculation of the value Erich(if)$_n$ energy required in the node n in the interval (if);
Phase H6) Calculation of the value Eced(if)$_n$ energy transferable from the node n in the interval (if);
End Logic H).

10. Architecture system of a local grid according to claim 1, characterised in that said electronic and self-configurable node controller (200) is connected to the single generation elements (111) of its own node, to the single storage elements (113) of its own node, to each meter of the energy that its own node is consuming, to every other node (11) connected in the local area grid (10); and wherein each controller (200) is comprehensive at least of:
access gates for the reception and sending of signals from/to the node peripheral devices, of the generators, accumulators and loads type, and also of the signals from/to the other nodes;
processors and/or microprocessors with high frequencies, from 1 to 100 KHz, for sampling the signals coming from the various above-described input/output gates to which the apparatus is connected, being comprehensive of metering systems;
processors for processing the signals received for the purpose of suitably managing the behaviour of the node on the basis of the particular logics of the routine and sub-routine type called: L/a, L/b, L/c, Logic D, Logic E, Logic F, Logic G and Logic H;
memories for the storage of data;
electronic filters for the elimination of signal interferences;
remote control switches for remote operations;
switches and disconnecting switches of power proportionate to the node;
wireless antenna for transmissions with radio-frequency devices;
sensors for functionality and safety controls.

* * * * *